Sept. 2, 1958     D. W. PETERSEN     2,850,119
MECHANICAL WEDGE-LOCK PARKING BRAKE
Filed Nov. 3, 1954
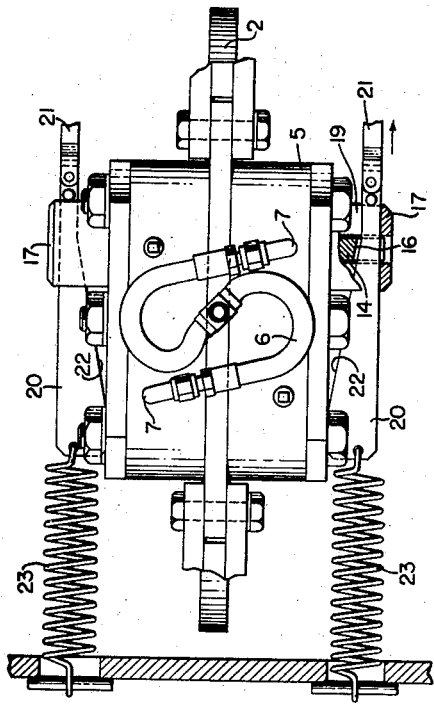
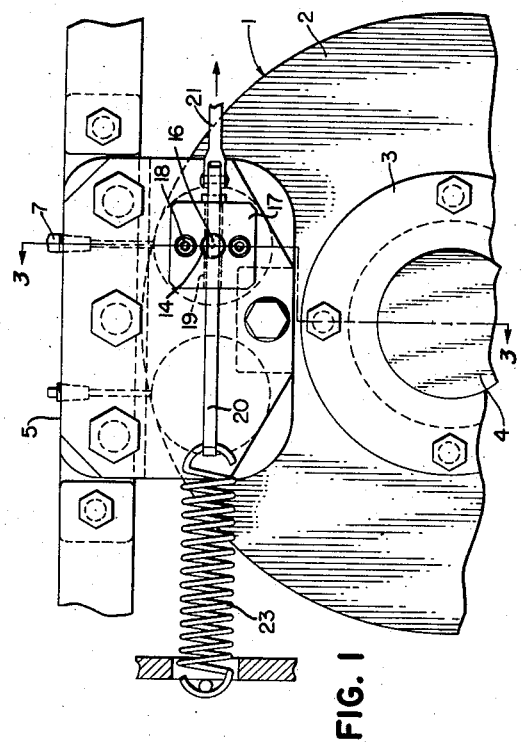
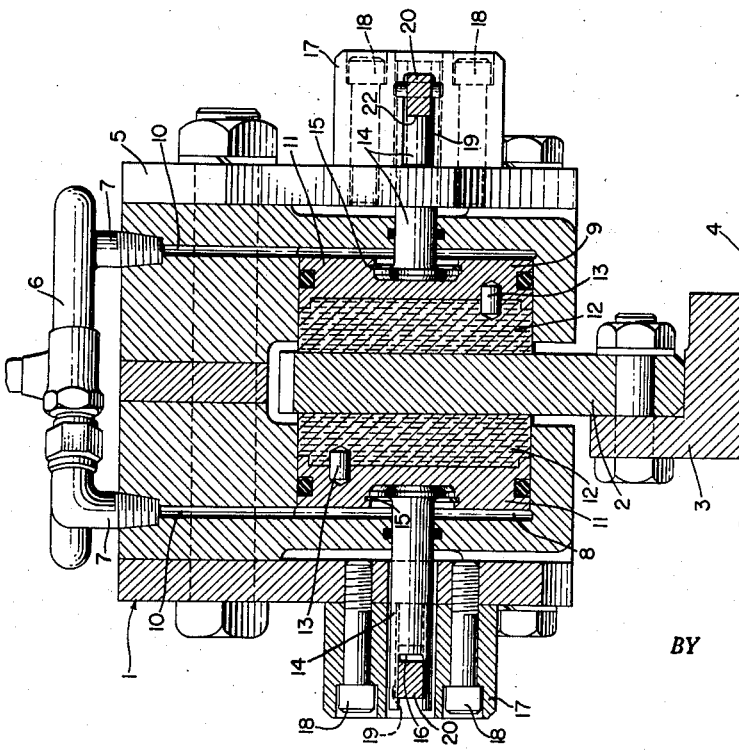
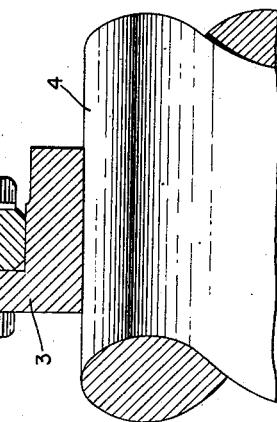
INVENTOR.
DON W. PETERSEN
BY
*R. L. Miller*
ATTORNEY

United States Patent Office 2,850,119
Patented Sept. 2, 1958

2,850,119

MECHANICAL WEDGE-LOCK PARKING BRAKE

Don W. Petersen, Akron, Ohio, assignor to The Goodyear Tire & Rubber Company, Akron, Ohio, a corporation of Ohio Application November 3, 1954, Serial No. 466,615

2 Claims. (Cl. 188—73)

This invention relates to brakes, and especially to a mechanical type of a parking brake particularly adapted for use with hydraulic braking means, for locking inoperative apparatus in such condition.

Many brakes in commercial use today are operated hydraulically as this is a very convenient and satisfactory way of effecting braking action rapidly at desired times. However, when it is desired to retain a braking pressure upon an article or vehicle when not in use or when parked, it sometimes is difficult to maintain the desired braking pressure on the brake because of slow leaks in the braking system. Obviously for safety it is normally necessary to have the braking forces exerted upon a parked vehicle or other type of apparatus maintained fully in force as long as the parked or inoperative condition exists.

The general object of the present invention is to provide a new and improved type of a braking apparatus by which a mechanical parked, or inoperative braked condition can be maintained in brake means otherwise operated hydraulically.

Another object of the invention is to provide a hydraulically operated brake with separate, usually inoperative means for use when desired in maintaining braking forces in existence for relatively long periods of time.

A further object of the invention is to provide a piston pin in a hydraulically operated brake, which piston pin is engaged with a wedge type of a locking bar adapted to hold or retain braking pressures on the piston and associated brake means at desired times when the hydraulic pressure normally exerted thereon for braking action is removed.

The foregoing and other objects and advantages of the invention will be made more apparent as the specification proceeds.

For a better understanding of the invention, attention is directed to the accompanying drawings, wherein:

Fig. 1 is a side elevation of a portion of brake means in association with a wheel and wherein such brake means embody the principles of the invention;

Fig. 2 is a top plan of the brake apparatus shown in Fig. 1; and

Fig. 3 is a vertical section taken on line 3—3 of Fig. 1 of the brake apparatus of the invention.

When referring to corresponding parts in the accompanying drawings and specification, corresponding numerals are used to facilitate comparison between such corresponding parts.

The present invention in general relates to a brake including a brake lining block for engaging a rotatable member for braking action thereon, a piston for operatively positioning the brake lining block, a piston pin carried by and extending from the piston, hydraulic means for actuating the piston for braking action, wedge-type locking means for engaging the piston pin to hold the piston in a given operative position, and means for moving the wedge-lock means to an inoperative position when the locking pressure exerted thereon by the piston pin is removed.

Attention now is directed to the details of the structure shown in the accompanying drawings, and a brake construction is indicated as a whole by the numeral 1. The brake 1 as shown is for braking action on a brake disc 2 secured to a hub ring 3 carried by an axle 4 and rotating therewith.

The brake 1 includes a housing, or a frame member 5 which is stationarily positioned with relation to the axle 4. Of course, the brake 1 and associated means can be used in conjunction with any desired rotative member, as desired.

The brake 1 is shown as being supplied with suitable operative means, normally hydraulic fluid through a fluid pressure supply line 6 which has a pair of outlet fittings or nipples 7 thereon in threaded engagement with tapped bores provided in the brake housing 5. Any suitable brake control means (not shown) are provided for controlling the hydraulic fluid in the line 6 to actuate the brake 1 as hereinafter described. Brake housing 5 preferably has a pair of fluid receiving chambers 8 and 9 provided therein and connected to the nipples 7 by individual bores 10.

The brake actuating means comprise pistons 11 one of which is slidably positioned in each of the hydraulic chambers 8 and 9 provided in the brake housing and movable therein dependent upon the pressure exerted thereon. Each of these pistons 11 has a brake lining or block 12 secured to the operative face thereof by retainer pins 13, or other conventional means, as desired. Thus when operative pressures are set up in the chambers 8 and 9, the pistons 11 are forced in towards the disc 2 to bring the brake blocks 12 into operative braking engagement therewith. If desired, means may be provided to move the pistons 11 to inoperative positions when braking pressure is not exerted on such pistons.

Each of the brake pistons 11 has a piston pin 14 extending therefrom and secured thereto, as by a snap ring 15. Figs. 2 and 3 of the drawings best illustrate the fact that the exposed or outer ends of the piston pins 14 are slotted at 16.

The brake housing 5 has guides, or guide blocks 17 suitably secured thereto on opposite sides thereof by cap screws 18. The blocks 17 each have a slot 19 in a base portion thereof extending transversely therethrough, which slot is in alignment with the slot 16 usually formed in the end of the piston pin 14 for receipt of a brake locking member therein.

The brake 1 as previously described is operated in a conventional manner by hydraulic fluid from the line 6 but, as a feature of the invention, can be retained in operative position mechanically by the means now to be specifically described. These means include a wedge shaped control link, or tapered drift 20, illustrated in Fig. 2 of the drawings, which control link 20 is secured to a mechanical braking member 21. One control link 20 is received in each of the guide blocks 17, it freely extends through the slot 19 therein to engage with one of the pair of braking members 21. Hence when mechanical braking action is desired, the braking member 21 for each piston pin 14 is actuated to move the control link 20 in the direction indicated in Fig. 2. Such movement of the wedge shaped control link, or control member 20 brings an inclined wedging surface 22 thereof into engagement with the end or edge of a slot in the body or end of the piston pin 14 to lock thereagainst by being forced against the top wall of the slot 19. Under normal braking conditions, the control link 20 is held spaced from the end of the associated piston pin 14 by a spring 23 but may be moved into brake-locking position by braking member 21. Thereafter fluid pressure exerted upon the pistons 11 can be released, or be permitted to bleed away and the control link 20 will retain the piston pin and pistons 11 operatively positioned with the brake blocks 12 engaging the brake disc 2. Hence the disc 2 will be effectively mechanically locked in inoperative position for a long period of time. When it is desired to release the control link 20 and permit the disc 2 to rotate, an application of fluid pressure through the line 6 will release the pressure exerted upon the control link 20 and permit a return spring 23 connected thereto to pull or draw such link back to inoperative position.

From the foregoing, it will be seen that the present invention provides the desired type of a brake wherein it can be operated by hydraulic means at most times but that mechanical means can be brought into action to maintain the brake in a locked operative position to permit release of the fluid pressure existing on or initially set up in the brake without loss of braking action. The control means are relatively simple and inexpensive in construction but positive in operation so that effective, safe braking action for parked or stopped members is secured and the objects of the invention are achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In a brake, a brake housing, a brake block for engaging a rotatable member, a piston received in a chamber in said brake housing for controlling said brake block, a piston pin secured to and extending from said piston, hydraulic means for actuating said piston to position said brake block operatively, a slotted guide carried by said brake housing with the end of said piston pin positioned therein, a tapered brake locking wedge member having its inclined surface located to engage the end of said piston pin and positioned to move along its longitudinal axis to wedge between the end of said piston pin and said guide, a mechanical braking member for moving said wedge member to a wedging position to hold said piston in a given position with said brake block operatively positioned by said hydraulic means, and spring means for moving said wedge member to inoperative position only after the locking pressure thereon is removed by re-application of such hydraulic means, the pitch of said wedge member being such that friction between it and said piston pin is greater than the strength of said spring when no hydraulic pressure is applied to said piston and cylinder.

2. A brake comprising a brake disc rotatable with a wheel, a non-rotatable support adjacent said disc, a movable brake block carried by said support for engagement with said disc, hydraulic fluid operated piston and cylinder means at said support for advancing the brake block towards the disc, a piston pin extending from said piston, a guideway on said support, a wedge member movable along said guideway to advance it into a locking position between said support and piston pin to prevent return of said brake block to inoperative position, a braking member connected to said wedge member for advancing it into such locking position, and a spring for returning said wedge member to a brake block freeing position, the pitch of said wedge member being such that friction between it and said piston pin is greater than the strength of said spring when no hydraulic pressure is applied to said piston and cylinder, said spring being capable of alone withdrawing said wedge member from a wedged brake engagement resulting from action of said braking member only after hydraulic pressure is applied to the piston and cylinder means.

References Cited in the file of this patent

UNITED STATES PATENTS

| 2,076,532 | Francoeur et al. | Apr. 13, 1937 |
| 2,140,750 | Kliesrath | Dec. 20, 1938 |
| 2,148,240 | La Brie | Feb. 21, 1939 |
| 2,170,893 | Gallup | Aug. 29, 1939 |
| 2,266,059 | Milan | Dec. 16, 1941 |
| 2,689,024 | Trevaskis | Sept. 14, 1954 |

FOREIGN PATENTS

| 688,382 | Great Britain | Mar. 4, 1953 |